Sept. 20, 1932.　　　　L. ULRICH　　　　1,878,734
BRAKE SYSTEM
Filed Feb. 7, 1931　　2 Sheets-Sheet 2
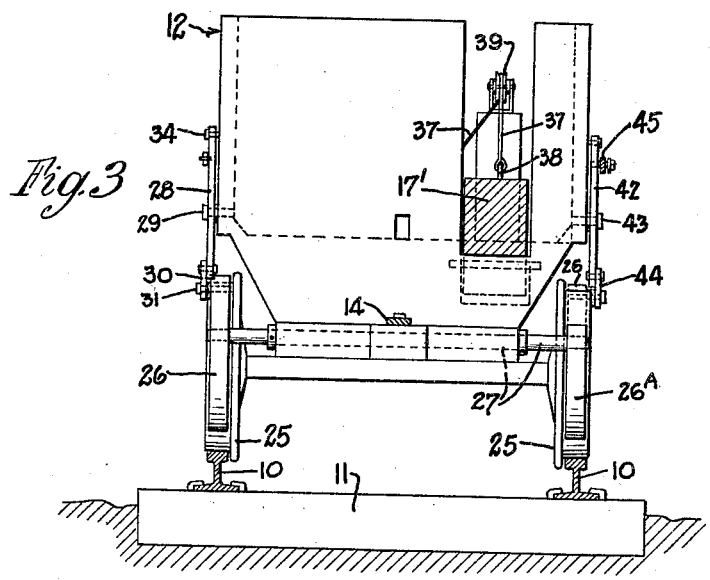
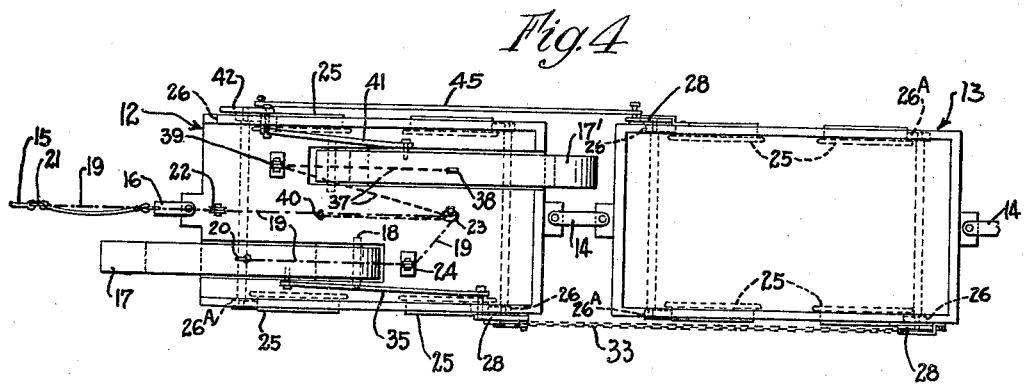
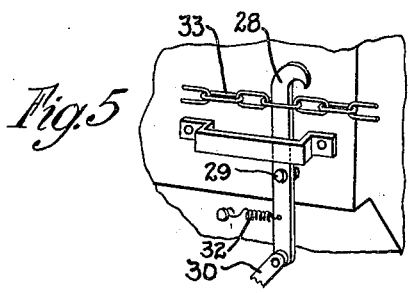
Inventor
Louis Ulrich
by Frank J Schraeder Jr
Attorney.

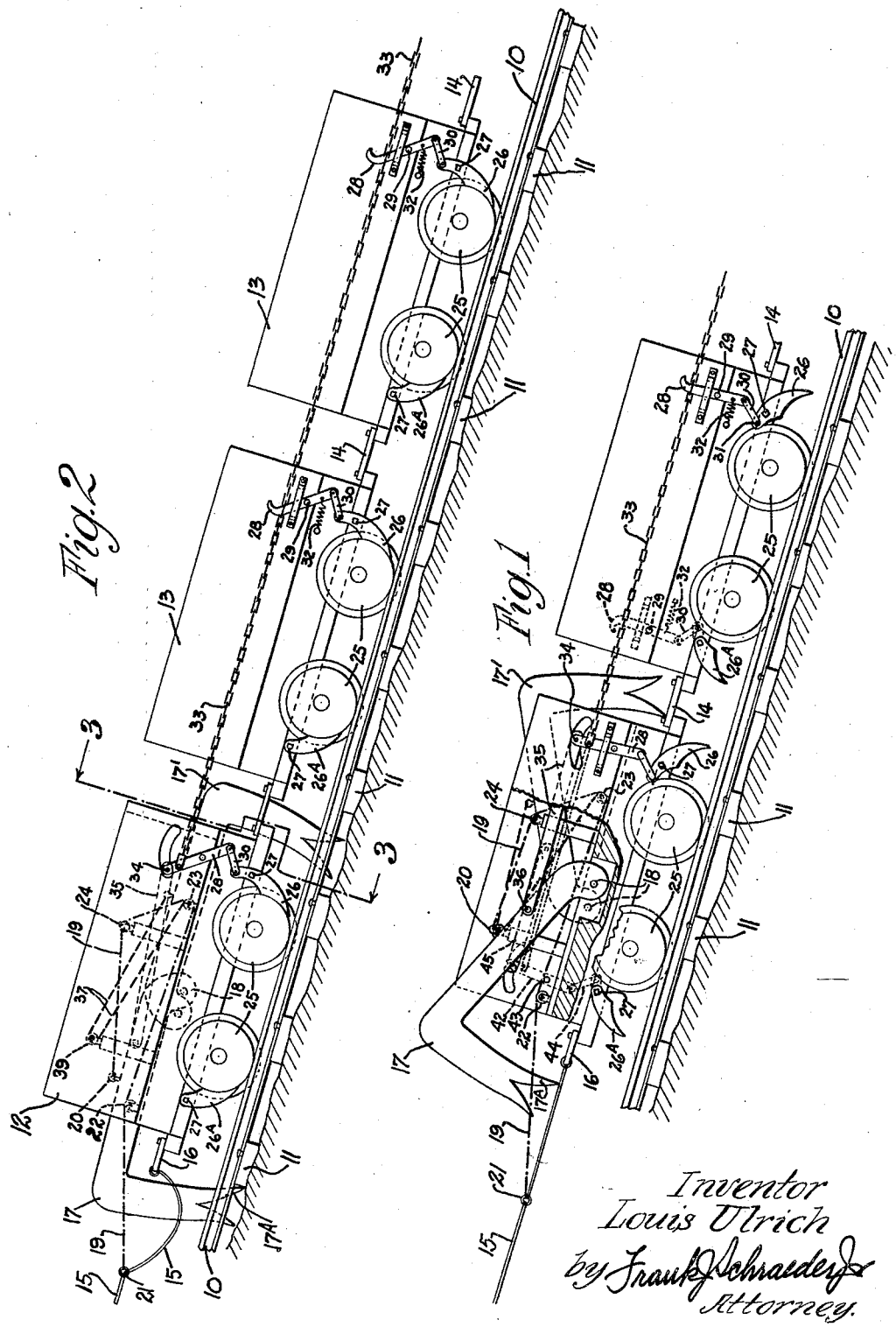

Patented Sept. 20, 1932

1,878,734

UNITED STATES PATENT OFFICE

LOUIS ULRICH, OF DOMINION, NOVA SCOTIA, CANADA

BRAKE SYSTEM

Application filed February 7, 1931. Serial No. 514,089.

This invention relates to braking systems for mine cars, and the like, and has among its objects to provide new and useful braking systems which are adaptable for use in controlling the movement of a train of mine cars which are hauled up and down an incline.

It is also among the objects of this invention to provide a train of cars or vehicles with a brake car having braking instrumentalities arranged for release upon the severance of the hauling rope or cable.

A further object of the invention is to provide each car or vehicle in the train with braking devices which are interconnected with the hauling rope or cable in a manner that in the event such hauling rope or cable is severed, the braking device on each car in the train will be actuated for immediate braking operation.

Still another object of my invention is to provide braking devices for the wheels of all cars or vehicles in the train and a braking device on the brake mechanism car adapted to engage the ties of the railroad under emergency conditions.

With the above and other objects in view, my invention consists in the novel combination, construction, and arrangement of the parts and members shown in one embodiment in the attached drawings, described in the following specifications, and particularly pointed out in the appended claim.

Referring to the drawings:

Fig. 1 is a side elevation of the brake car and one of the train cars; the brake car having a portion of its side broken to show the interior.

Fig. 2 is a side elevation of the brake car and two of the train cars.

Fig. 3 is a cross-section through the brake car taken on line 3—3 of Fig. 2.

Fig. 4 is a plan view of the brake car and one of the train cars.

Fig. 5 is a perspective view of a brake lever.

Referring to the illustrations, 10 indicates a pair of rails which are mounted on the ties 11. In the system herein shown, each train, which consists of a plurality of mine cars 13, is also provided with one brake car 12 which contains a brake mechanism which is adapted to actuate the brakes of the train of mine cars 13 in the event the hauling rope is severed. The actuation of the brake mechanism and brakes of each of the mine cars 13 would act to stop the uncontrolled descent of the train on an incline trackway.

The brake car 12 and mine cars 13 are interconnected with each other by means of link connections 14.

The hauling ropes or cable 15 extends up the incline to any suitable type of hoisting engine and one end is connected to the link 16 of the brake car 12.

The brake car 12 is provided with a comparatively heavy emergency brake hook 17 which is substantially L-shaped and pivoted at 18 in the floor recess of the car.

When the train of cars is hauled up and down the incline, the brake hook 17 is maintained in raised position as shown in Fig. 1, by means of a cable or chain 19, one end of which is secured to an eye-bolt 20 in the hook 17 and the other end of which is fastened to a ring 21 near the car-connection end of the rope or cable 15. The cable or chain 19 is trained over suitable guide sheaves 22, 23 and 24, and obviously, while the haulage rope 15 is held taut, the hook 17 is held in raised position.

Assuming now that the haulage rope 15 should break or for some reason be severed, it will immediately sag as shown in Fig. 2, which will release the tightened cable or chain 19 to permit the heavy hook 17 to drop and engage the ground or ties 11 by its pointed end 17$^A$ to effect a frictional braking of the train of cars.

In addition, to the braking power of the hook 17, I provide a braking system for the wheels of brake car 12 and mine cars 13. One set of wheels 25 is provided with a pair of brake shoes 26 and 26$^A$ which are rigidly mounted on a pivot shaft 27 extending traversely of the car. A brake lever 28 pivotally mounted at 29 is provided for each car.

The lower ends of the brake levers 28 are connected by links 30 with a pivot bolt 31 of the brake shoe 26. A suitable spring 32 retains the lever 28 in a position to normally retain the brake shoes 26 and 26A in raised position, as shown in Fig. 1.

The brake shoe 26A, which in each case, is located on the opposite side of the car on which the brake lever 28 is mounted, is rigidly mounted to the end of the rotatable shaft 27, and obviously is coactive with its opposite brake shoe 26.

A continuous braking chain 33 interconnects the upper ends of the brake levers 28 of the mine cars 13 with the similar brake lever 28 of the brake car 12. However, the upper end of the brake lever 28 of the brake car 12 is provided with a pivot bolt 34 for pivotal connection with a steel link 35 the other end of which is pivotally connected with the hook 17 at 36.

It will now be readily apparent that in the event, as above stated, of the severance of the haulage rope 15, the dropping of the hook 17 will also cause an application of the brakes 26 and 26A on one set of wheels on each car through the movement of the link 35 and its connected brake lever 28 and obviously all the brake levers 28 which are interconnected by the chain 33 with the brake lever 28 of the brake car 12.

If it should be so desired, the braking power of the whole system could be readily doubled, by substantially doubling the braking elements and employing two brake hooks 17 disposed in the same direction, one on each side of the brake car 12 and interconnected with oppositely disposed brake levers 28 for the other set of wheels on each car.

In the illustration, however, I have preferred to show a double braking system wherein the brake hooks 17 are oppositely disposed, one overhanging one end of the brake car 12 and the other hook, the other end of the car. In this particular arrangement the chain or cable 37 is attached at 38 to the hook 17¹ and passes over the sheave 39 and around the sheave 23, which sheave 23 in this instance is provided with a face wide enough to also receive the cable or chain 19 to which the chain or cable 37 is secured at a point indicated by 40.

The hook 17¹ is also pivotally connected by link 41 to the brake lever 42 which is pivoted at 43 and at its lower end connected by a link 44 to a brake shoe 26 mounted on one end of shaft 27, the other end of which carries a brake shoe 27A.

The brake lever 28, on the far side of the brake car 12 as viewed in Figs. 1 and 2, could of course be connected to a similar brake lever 28 on the same side of the adjacent car 13 by means of a steel link 45 to cause its operation, (see Fig. 4).

While I have described several applications or modifications of my brake system, the simplest form of course, is the single brake hook system described in the first part of my specification.

I claim:

In a brake system for a train of cars adapted to be moved up and down an incline with a haulage cable, a brake control car in said train, a brake mechanism on said brake control car, brakes for the wheels of the other cars of said train, said mechanism on said brake car comprising a brake hook pivotally mounted on said brake car and normally held in raised position, means connecting said hook and said haulage cable adapted upon the severance of said cable to release said hook to drop by gravity and to engage the trackway to interpose frictional resistance to said train, and connections between said brake hook and the brakes on said other cars for actuating the brakes upon the release of said brake hook.

In witness whereof, I affix my signature.

LOUIS ULRICH.